United States Patent
Ikawa (10) Patent No.: US 7,336,657 B2
(45) Date of Patent: Feb. 26, 2008

(54) INTER-NODAL DATA TRANSFER SYSTEM AND DATA TRANSFER APPARATUS

(75) Inventor: Yasuhiro Ikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1028 days.

(21) Appl. No.: 10/198,984

(22) Filed: Jul. 22, 2002

(65) Prior Publication Data

US 2003/0026249 A1 Feb. 6, 2003

(30) Foreign Application Priority Data

Jul. 31, 2001 (JP) .............................. 2001-231003

(51) Int. Cl.
*H04L 12/50* (2006.01)
(52) U.S. Cl. ....................... 370/360; 370/242; 340/2.28
(58) Field of Classification Search ...................... None
See application file for complete search history.

(56) References Cited

U.S. PATENT DOCUMENTS

| | | |
|---|---|---|
| 4,695,999 A | 9/1987 | Libizay |
| 5,181,017 A * | 1/1993 | Frey et al. .................. 709/239 |
| 5,890,007 A | 3/1999 | Zinguuzi |
| 5,901,294 A | 5/1999 | Tran et al. |
| 6,334,177 B1 * | 12/2001 | Baumgartner et al. ......... 712/13 |
| 6,457,100 B1 * | 9/2002 | Ignatowski et al. ......... 711/119 |
| 6,738,870 B2 * | 5/2004 | Van Huben et al. ........ 711/150 |

FOREIGN PATENT DOCUMENTS

| | | |
|---|---|---|
| EP | 0 366 935 A2 | 5/1990 |
| JP | 2000-112912 A | 4/2000 |
| JP | 2000-267927 A | 9/2000 |
| JP | 2001-51966 A | 2/2001 |
| WO | WO 99/18697 A1 | 4/1999 |

* cited by examiner

*Primary Examiner*—Duc Ho
(74) *Attorney, Agent, or Firm*—Sughrue Mion, PLLC (57) ABSTRACT

A plurality of inter-nodal control means are provided at a connection part between an inter-nodal crossbar switch for an inter-nodal data transfer and each node so as to process one inter-nodal transfer command, and an inter-nodal transfer capacity can be variably set in accordance with a capacity within a node. In this case, in the data transfer apparatus, at a connection part between an inter-nodal crossbar switch 11 for the inter-nodal data transfer and each node 12, 13, a plurality of inter-nodal control devices (RCUs) 123, 124; 133, 134 for processing one inter-nodal transfer command are provided.

14 Claims, 9 Drawing Sheets

ONE EXAMPLE OF INTER-NODAL DATA TRANSFER COMMAND CONVERTED INTO MEMORY ACCESS FORMAT

| NOTIFICATION DESTINATION | NOTIFICATION ORIGIN | AUXILIARY INFORMATION | COMMAND CODE | REQUEST AUXILIARY INFORMATION |
|---|---|---|---|---|
| NOTIFICATION DESTINATION | NOTIFICATION ORIGIN | AUXILIARY INFORMATION | PARAMETER STORAGE ADDRESS ||

FIG. 8

ONE EXAMPLE OF INTER-NODAL TRANSFER PARAMETERS STORED IN PARAMETER STORAGE REGION ON COMMON MEMORY

ONE EXAMPLE OF GENERATION METHOD OF TRANSFER DESTINATION PORT NUMBER

| RCU NUMBER | REMOTE NODE NUMBER | LOCAL RCU NUMBER | TRANSFER DESTINATION PORT NUMBER | TRANSFER DESTINATION PORT NUMBER GENERATING METHOD |
|---|---|---|---|---|
| 2 | 0 | 0 | 0 | |
| | | 1 | 1 | |
| | 1 | 0 | 2 | |
| | | 1 | 3 | NODE NUMBER / RCU NUMBER |
| | 2 | 0 | 4 | |
| | | 1 | 5 | |
| | 3 | 0 | 6 | |
| | | 1 | 7 | |
| 4 | 0 | 0 | 0 | |
| | | 1 | 1 | |
| | | 2 | 2 | |
| | | 3 | 3 | NODE NUMBER / RCU NUMBER |
| | 1 | 0 | 4 | |
| | | 1 | 5 | 3 bits |
| | | 2 | 6 | |
| | | 3 | 7 | |

FIG. 11

TRANSFER DESTINATION PORT NUMBER GENERATION IN CASE THAT TROUBLE OCCURS IN RCU 1 OF NODE 1 LIKE FIG. 6

| RCU NUMBER | REMOTE NODE NUMBER | LOCAL RCU NUMBER | TRANSFER DESTINATION PORT NUMBER |
|---|---|---|---|
| 2 | 0 | 0 | 0 |
| | | 1 | 1 |
| | 1 | 0 | 2 |
| | | 1 | 2 |
| | 2 | 0 | 4 |
| | | 1 | 5 |
| | 3 | 0 | 6 |
| | | 1 | 7 |

CONFIGURATION PORT STATUS REGISTER

CONFIGURATION PORT STATUS REGISTER IS PROVIDED WITHIN INTER-NODAL CROSSBAR SWITCH, AND PORT 3 AT WHICH TROUBLE OCCURS IS DETECTED, AND THEREBY, PORT 3 IS CONTROLLED SO AS NOT TO BE USED.

FIG. 12

DETECTION OF PROCESSING RCU IN CASE THAT TROUBLE OCCURS IN RCU 1 OF NODE 1 LIKE FIG. 6

CONFIGURATION INFORMATION REGISTER OF RCU

PARAMETER STORAGE ADDRESS

128B BOUNDARY

PROCESSING RCU IS DETERMINED AS FOLLOWS BASED ON THE EIGHTH BIT EXCEPT 7 BITS OF 128B BOUNDARY

0: RCU 0
1: RCU 1

( CONFIGURATION INFORMATION REGISTER OF RCU IS PROVIDED WITH PROCESSING RCU DETERMINATION CIRCUIT, SO THAT COMMAND IS CONTROLLED NOT TO BE ISSUED TO RCU 1 IN WHICH TROUBLE OCCURS. )

INTER-NODAL DATA TRANSFER SYSTEM AND DATA TRANSFER APPARATUS

BACKGROUND OF THE INVENTION

The present invention relates to a system of conducting an inter-nodal data transfer and an inter-nodal data transfer apparatus in a multi-node computer system to which a plurality of nodes having inter-nodal control devices are connected via an inter-nodal crossbar switch.

An inter-nodal data transfer system with respect to the present invention is used especially for a multi-node computer (a distributed memory type parallel computer) system in which a plurality of nodes configured of a plurality of processors and common memories are connected to conduct a data transfer between the nodes.

Such multi-node computer system generally has a plurality of processors for improving a command processing capacity within the nodes, and by executing commands in parallel in each processor, the capacity for the nodes is improved, and however, in association with the improvement in recent years of the command processing capacity within the nodes, a high inter-nodal data transfer capacity corresponding to the capacity within the nodes is required for improving a capacity of the system as a whole.

To response to this requirement, as disclosed in JP-A267927/2000 for example, in a data transfer between the nodes, it is proposed to obtain a high data transfer capacity by expanding data width and increasing a data content which can be transferred one time.

Figure 2:
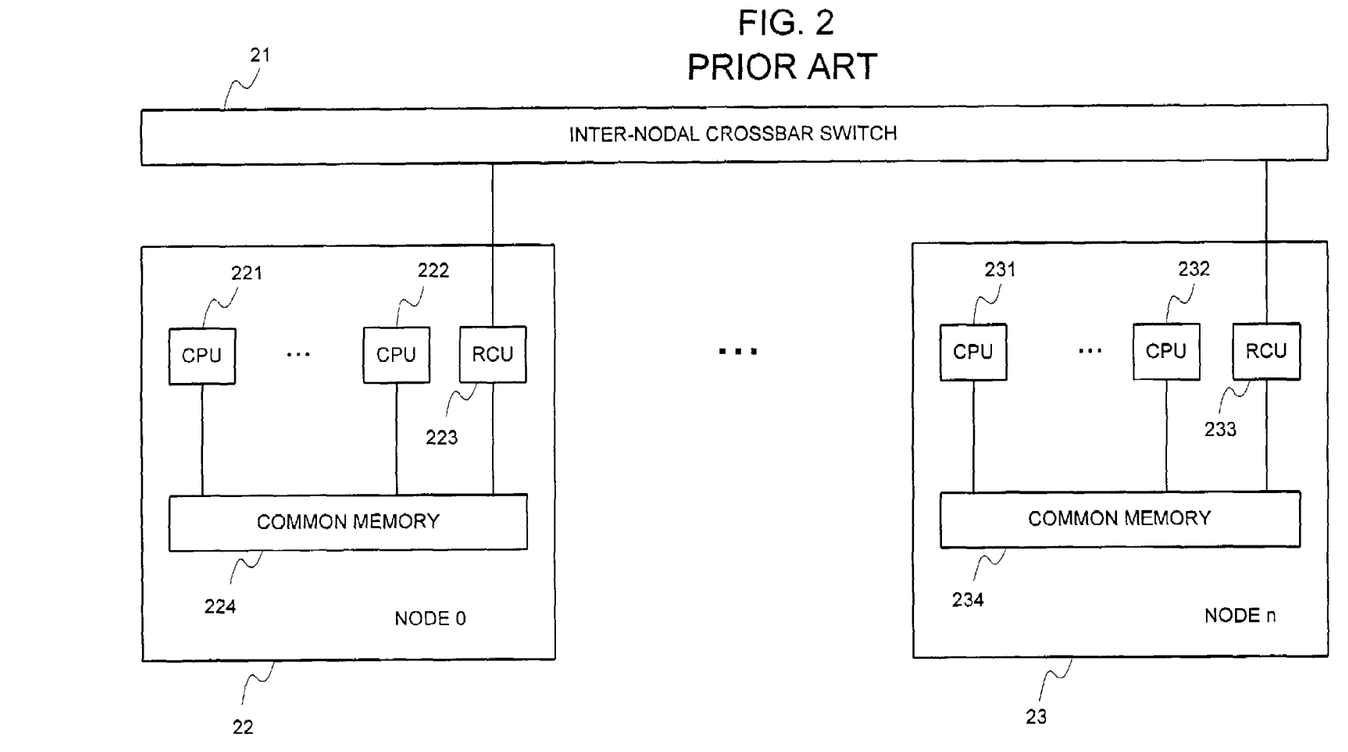
FIG. 2 is a block diagram showing an example of a multi-node computer system in relation to a prior art.

In the technique disclosed in this prior art, as shown in FIG. 2 attached to the present application, only one inter-nodal control device (referred to as an RCU, hereinafter) for controlling a connection state between the nodes. Accordingly, in an operation for an inter-nodal data transfer, a data content which can be transferred one time is increased by expanding data width, and a time period required for one command for instructing a transfer is shorten, and thereby, a capacity is improved.

As a result, in conducting a two-distance transfer, it is necessary to provide a circuit for conducting an order assurance between data of 8 bytes within data defined by the transfer, and there is a defect that HW (hardware) is increased in quantity.

Also, since transfer data width is determined to some extent, it is difficult to change an inter-nodal transfer capacity flexibly in accordance with a system configuration, and there is also a task that useless HW becomes necessary in a case of accommodating itself to a system in which the number of processors is reduced and a capacity within nodes is reduced or to a system in which the number of processors is increased and a capacity within nodes is gained.

Furthermore, since the transfer capacity is improved due to the expansion of the data width, the transfer is not efficiently conducted in a case where a data, a content of which is smaller than the data width, is transferred and in a case where a fraction occurs in the data width, and there is also a task that a full transfer capacity cannot be exhibited.

There is JP-A-112912/2000 that discloses a similar prior art. A processing system of a distributed memory type parallel computer is also disclosed here, in which one RCU is provided for each node, and test and copy of a data or the like to a remote memory are performed at a high speed. According to this prior art, a command or the like and a copied data are transferred rapidly, and a retry-sequence of a test command is improved, and as a result, test and copy processing of the distributed memory type parallel computer is conducted at a high speed. However, since the RCU for each node is one, the high speed processing involuntarily has a limitation.

Further, according to JP-A-51966/2001, a node apparatus, a parallel processing system and a parallel processing system for dividing one job into a plurality of processes and processing them by means of a plurality of node devices, and a storage medium in which a parallel processing program is recorded are disclosed. A technical idea disclosed here relates to an apparatus, a system and other means for dividing one job into a plurality of processes and processing them in parallel by means of a plurality of node devices while making a complicated synchronous mechanism and a specific communication mechanism unnecessary. Each node device in this case is configured of a communication control unit, a CPU that is a plurality of processors and a main storage device. The communication control unit has a barrier synchronous mechanism within a node for detecting that barrier synchronization is established within the node device itself based on a synchronizing request from each CPU, and notifying the whole node devices for executing parallel processing of information representing this state of the establishment via a communication cable, and an inter-nodal barrier synchronous mechanism for detecting that the parallel processing is completed based on the information of the establishment of the barrier synchronization within other node devices, which is notified by other whole node devices for executing the parallel processing via the communication cable. The communication control unit in such an arrangement is configured as one system.

SUMMARY OF THE INVENTION

An object of the present invention is to provide a system and an apparatus for conducting an inter-nodal data transfer, which improve a transfer capacity and can realize environment capable of flexibly forming an inter-nodal transfer capacity corresponding to a capacity within a node by providing a plurality of inter-nodal control devices (RCUs) for processing an inter-nodal transfer, and incorporating a function for allocating a data transfer command to each RCU and making individual commands operate in parallel.

The task in relation to the present invention is solved by an inter-nodal data transfer system in a multi-node computer system in which a plurality of nodes are connected in parallel, wherein a plurality of inter-nodal control means are provided at a connection part between an inter-nodal crossbar switch for conducting an inter-nodal data transfer and each node so as to process one inter-nodal transfer command, and an inter-nodal transfer capacity can be variably set in accordance with a capacity within a node.

In addition, processing RCU determination means for allocating a command to said inter-nodal control means is provided, and said inter-nodal control means comprises port number generating means for generating routing information of the inter-nodal crossbar switch, and trouble management means of said inter-nodal control means is provided within said inter-nodal crossbar switch, and trouble management is conducted, and thereby, the task is solved further advantageously.

Further, the task in relation, to the present invention is solved by an inter-nodal data transfer apparatus in a multi-node computer system in which a plurality of nodes are connected in parallel, wherein a plurality of inter-nodal control devices, each of which processes one inter-nodal transfer command, are provided at a connection part between an inter-nodal crossbar switch for conducting an inter-nodal data transfer and each node.

In addition, a processing RCU determination circuit for allocating a command to said inter-nodal control devices is provided within a processor, and said inter-nodal control device comprises a port number generating circuit for generating routing information of the inter-nodal crossbar switch, and a trouble management circuit of said inter-nodal control means is provided within said inter-nodal crossbar switch, and trouble management is conducted, and thereby, the task is solved further advantageously.

In this manner, the present invention is characterized to have a system and an apparatus in a multi-node computer system in which the nodes having the plurality of inter-nodal control devices are connected via the inter-nodal crossbar switch, wherein the plurality of inter-nodal control devices capable of processing one inter-nodal transfer command are provided at the connection part between the inter-nodal crossbar switch for an inter-nodal data transfer and each node.

Figure 1:
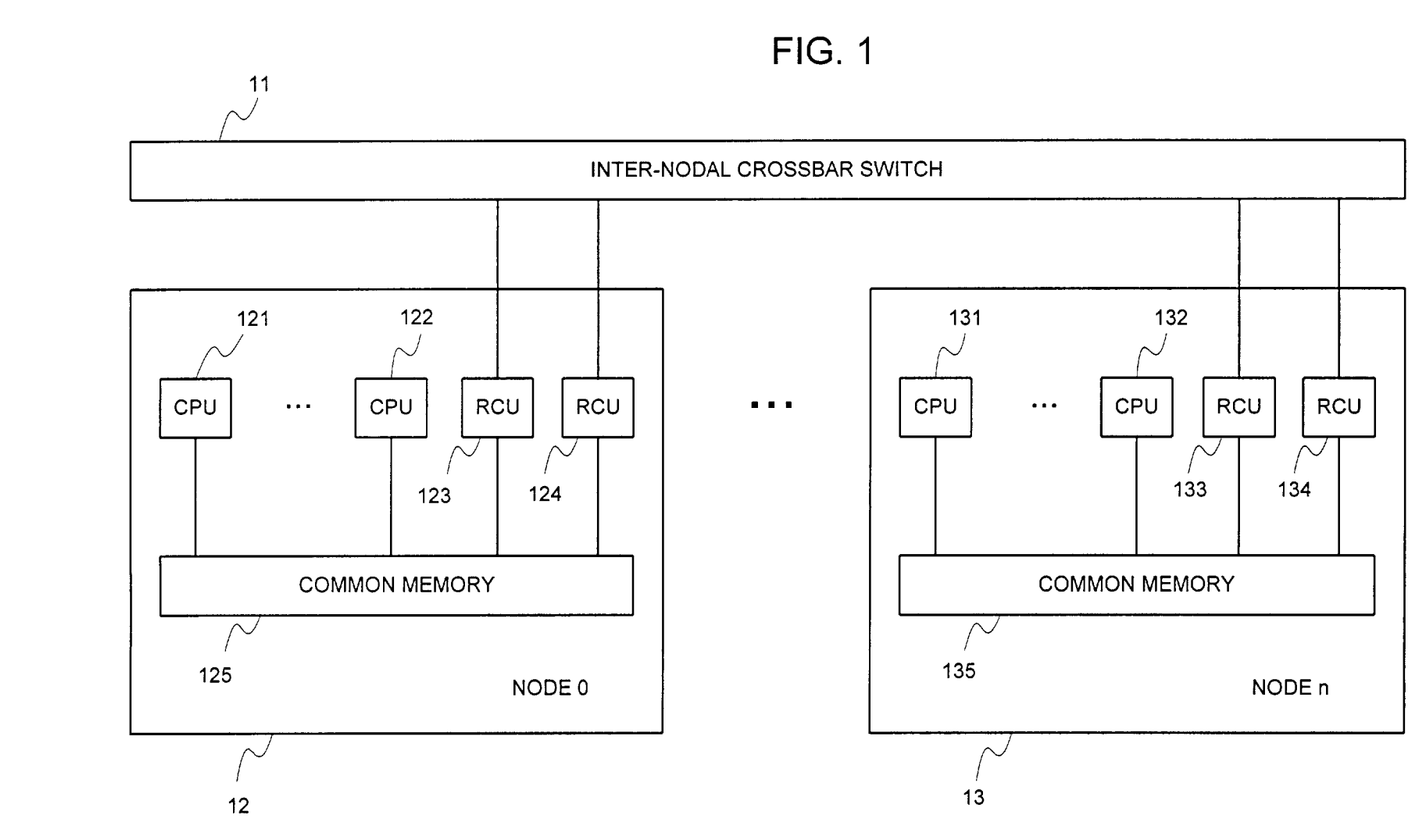
FIG. 1 is a block diagram showing a first embodiment of a multi-node computer system in relation to the present invention.
Figure 3:
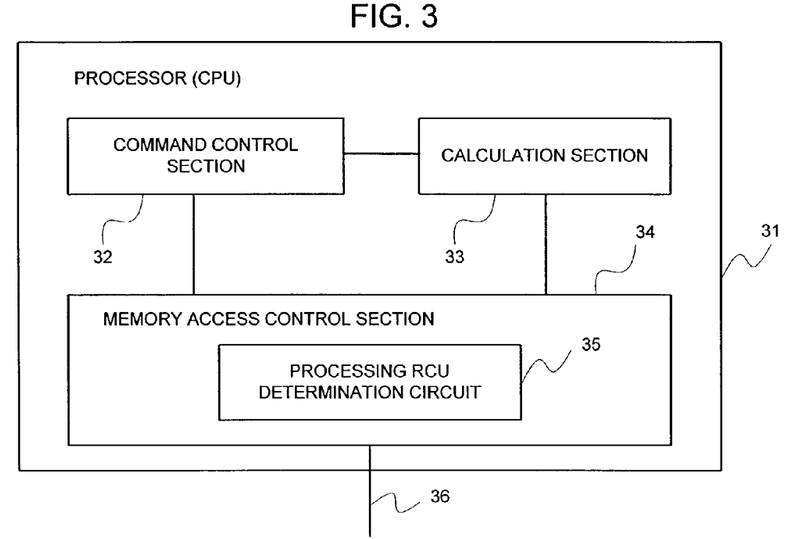
FIG. 3 is a block diagram showing an arrangement example of a processor (CPU) in the multi-node computer system in relation to the present invention.
Figure 4:
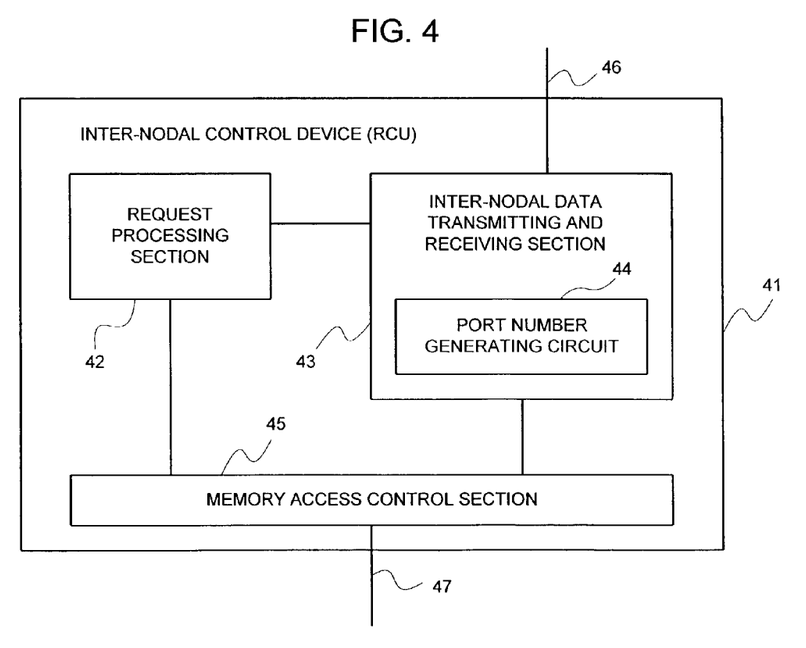
FIG. 4 is a block diagram showing an arrangement example of an inter-nodal control device (RCU) in the multi-node computer system in relation to the present invention.

This is established by providing a CPU shown in FIG. 1 with the processing RCU determination circuit for allocating a command to the plurality of inter-nodal control devices within a processor as shown in FIG. 3, and by providing an RCU shown in FIG. 1 with the port number generating circuit for generating routing information of the inter-nodal crossbar switch within the inter-nodal control devices of FIG. 4.

By providing the plurality of inter-nodal control devices capable of processing one inter-nodal transfer command, for a data transfer between the nodes, an operation that a plurality of commands transfer data in parallel is performed.

Accordingly, an advantage that a data transfer capacity is conducted at a high speed can be obtained.

Also, the present invention is characterized in that a smooth data transfer can be conducted by providing the trouble management circuit of the inter-nodal control device (RCU) within the inter-nodal crossbar switch, and appropriately managing the RCU in which a trouble occurs.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Referring to FIG. 1, as one embodiment of the present invention, a multi-node computer system is shown, which is constructed of nodes 12-0, 13-n having a plurality of inter-nodal control devices connected to each other via an inter-nodal crossbar switch 11. This multi-node computer system has the plurality of node 12-0 . . . , 13-n, and the inter-nodal crossbar switch 11 for connecting the nodes to each other.

The node 12-0 is constructed of a plurality of central processing processors (referred to as CPUs, hereinafter) 121, 122, a plurality of (two in FIG. 1) inter-nodal control devices (referred to as RCUs, hereinafter) 123 and 124, and a common memory 125 that all of the CPUs and RCUs share. Similarly, the 13-n is constructed of a plurality of CPUs 131, 132, a plurality of (two in FIG. 1) RCUs 133 and 134, and a common memory 135 that all of the CPUs and RCUs share. Also, in each node, the plurality of (two in FIG. 1) RCUs 123, 124 and 133, 134 are connected to the inter-nodal crossbar switch 11, respectively.

In such an arrangement, a data transfer between the nodes is initiated when a transfer request is notified from the CPU within a node to the RCU within the node. For example, in case that a data within the common memory 125 of the node 12-0 is transferred to the common memory 135 of the node 13-n, the RCU 123 that received the transfer request from the CPU 121 reads out a data to be transferred from the common memory 125, and transfers it to the inter-nodal crossbar switch 11. In the inter-nodal crossbar switch 11, a switch of the crossbar is switched in accordance with a transfer destination port number of the data that was sent, and the data is transferred to the node 13-n. The transferred data sent from the inter-nodal crossbar switch 11 is received by the RCU 133 of the node 13-n, and is written in the common memory 135. In the above manner, the inter-nodal data transfer is conducted.

Referring to FIG. 3, a detailed configuration of the CPUs 121, 122, 131 and 132 shown in FIG. 1 is shown. A reference symbol 32 is a command control section that reads a command to be processed by this processor from the common memory, and conducts operation instruction to a calculation section 33 or a memory access control section 34 in accordance with the contents of the command. The calculation section 33 reads the contents of an internal register which is not shown in figures and conducts calculation in accordance with the contents instructed by the command control section 32, and writes a result thereof in the internal register. The memory access control section 34 writes the calculation result in the common memory in accordance with the instruction of the command control section 32, and reads a calculated data from the common memory. A processing RCU determination circuit 35 is a circuit for determining an RCU which processes an inter-nodal transfer command out of the a plurality of existing RCUs provided within the memory access control section in accordance with the present invention.

When detecting an inter-nodal data transfer command, the command control section 32 notifies the memory access control section 34 of the detection with the contents of the command attached thereto. The memory access control section converts the notified contents into a format of memory access exemplified in FIG. 7 so as to use a memory access path 36 in common with a request path to the RCU. In this time, by means of the processing RCU determination circuit 35, an RCU that processes this command is determined, and an RCU number is attached to a field showing a notification destination within a memory access format of FIG. 7. The inter-nodal data transfer command that is format-converted in this manner is sent to the common memory as an RCU request by means of the memory access path 36, and in the common memory, routing to a desired RCU is conducted in accordance with the contents of the notification destination field.

Referring to FIG. 4, a detailed configuration of the RCU shown is FIG. 1 is shown. A request processing section 42 is a circuit for receiving the RCU request sent from the CPU in the format of FIG. 7 via a memory access control section 45 connected to the common memory by a connection path 47, and providing operation instruction to an inter-nodal data transmitting and receiving section 43 or the memory access control section 45 in accordance with the contents of the request. The inter-nodal data transmitting and receiving section 43 is a circuit connected to the inter-nodal crossbar switch 11 (refer to FIG. 1) by means of a signal line 46, and for conducting an exchange of a data or control information with other nodes. The memory access control section 34 is a circuit connected to the common memory within the node by means of a signal line 47, and for conducting an exchange of a data or control information with the common memory in accordance with the instruction of the request processing section 42. A port number generating circuit 44 is a circuit provided in accordance with the present invention, and is a circuit for generating a transfer destination port number as routing information in the inter-nodal crossbar switch 11, based on a transfer destination node number and an RCU number. The generated port number is sent to the inter-nodal crossbar switch together with control information or a transferred data, and in the inter-nodal crossbar switch, a switch is switched to a port of a transfer destination, and thereby, the control information or data is sent to a desired node.

Also, the RCU shown in FIG. 4 reads a data from the common memory within the node in accordance with an inter-nodal control signal sent from other nodes, and also, conducts a transfer of the read data to a node from which the request originated or writing operation of a transferred data in the common memory within the node, which was sent from the node from which the request was originated. In the inter-nodal data transfer, before data transmission, control information of the data transfer is sent to the inter-nodal data transmitting and receiving section 43 through the connection path 46.

The control information that was sent is sent to the request processing section, and instruction in accordance with the control information is issued to the memory access control section 45 and the inert-nodal data transmitting and receiving section 43. The memory access control section 45 conducts an exchange of a data with the common memory in accordance with the instruction from the request processing section 42. The inter-nodal data transmitting and receiving section 43 also conducts an exchange of a control signal or a data with other nodes in accordance with the instruction of the request processing section 42. In addition, the port number generating circuit 44 generates a transfer destination port number that is routing information of the inter-nodal crossbar switch in conducting an exchange of a control signal or a data with other nodes.

Figure 5:
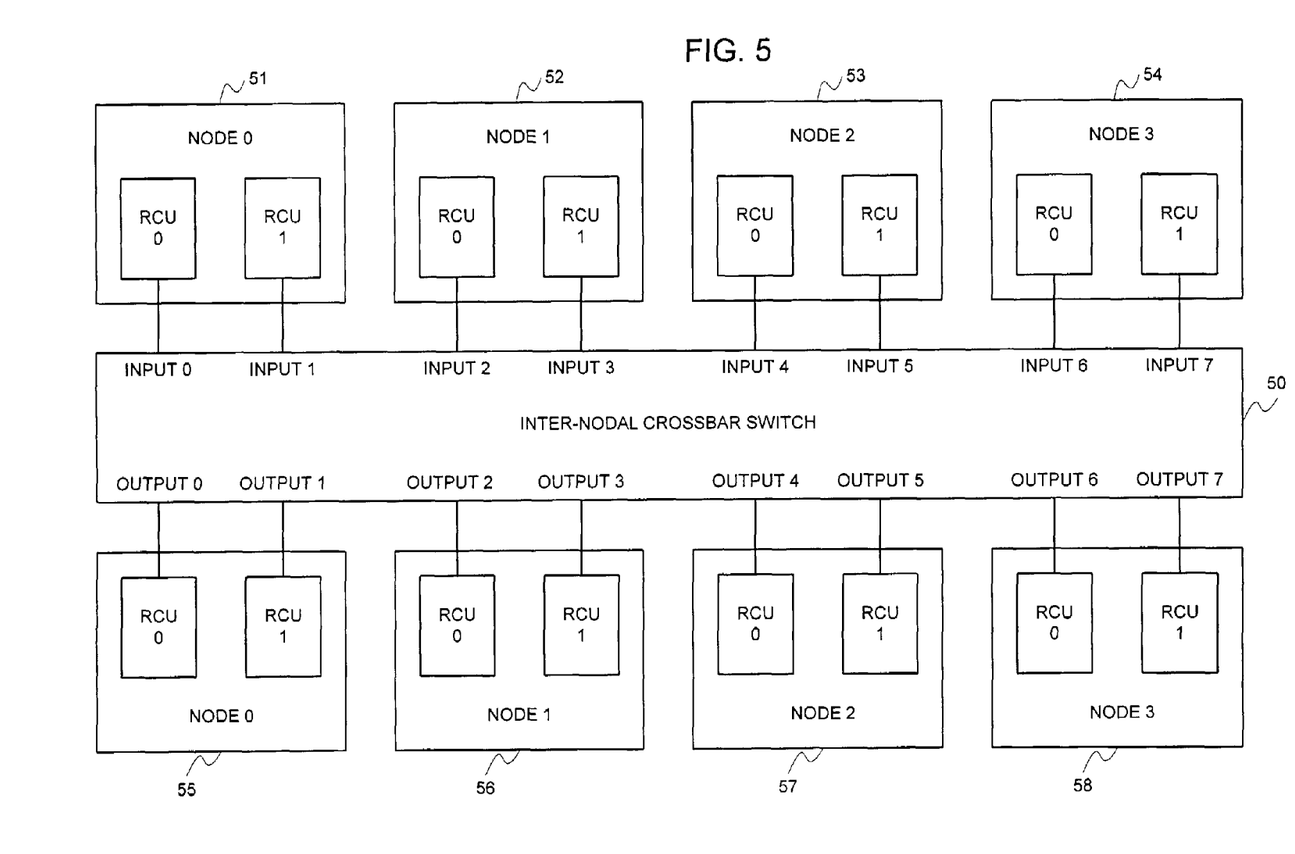
FIG. 5 is a block diagram showing an arrangement example of an inter-nodal crossbar switch in the multi-node computer system in relation to the present invention.

Referring to FIG. 5, one example of the inter-nodal crossbar switch of FIG. 1 is shown. An inter-nodal crossbar switch 50 is constructed of an 8×8 crossbar in which its inputs are 8 ports and its outputs are 8 ports. In FIG. 5, for convenience of explanation, each node is described by dividing it into data transmission nodes 51-54 and data reception nodes 55-58. Also, as one example of the present invention, the number of RCUs within each node is two of an RCU 0 and an RCU 1. The inter-nodal crossbar switch 50 can conduct a data transfer from the eight inputs to the eight outputs, respectively. This is conducted by means of the transfer destination port number sent from the RCUs connected to the input ports.

For example, if transfer destination port information is 0, its output is an output 0, in other words, the data is transferred to an RCU 0 of a node 0, and also, if a transfer destination port number is 3, its output is an output 3, in other words, the data is transferred to an RCU 1 of a node 1, and in this manner, a value indicated by the transfer destination port number becomes an output port, and the data is transferred to an RCU connected thereto. In this manner, the inter-nodal crossbar switch 50 has an arrangement capable of sending control information and a data from all input ports to all output ports based on the specification of the transfer destination port number.

An operation of the first embodiment configured in this manner will be explained below. In a node having the plurality of processors (CPUs) and a memory shared by the CPUs, an inter-nodal transfer command is established when a user program maintains an inter-nodal transfer queue on the common memory and writes parameters necessary for the transfer in the maintained queue, and thereafter, the user program issues an inter-nodal transfer command indicating a parameter position from the CPUs.

In this embodiment, the inter-nodal control device (RCU) is only one in the user program. The maintenance of the queue is conducted by means of the use programs on the plurality of CPUs, and commands are accumulated in order in one queue on the common memory. This is for making the user program not aware of an HW arrangement.

Figure 9:
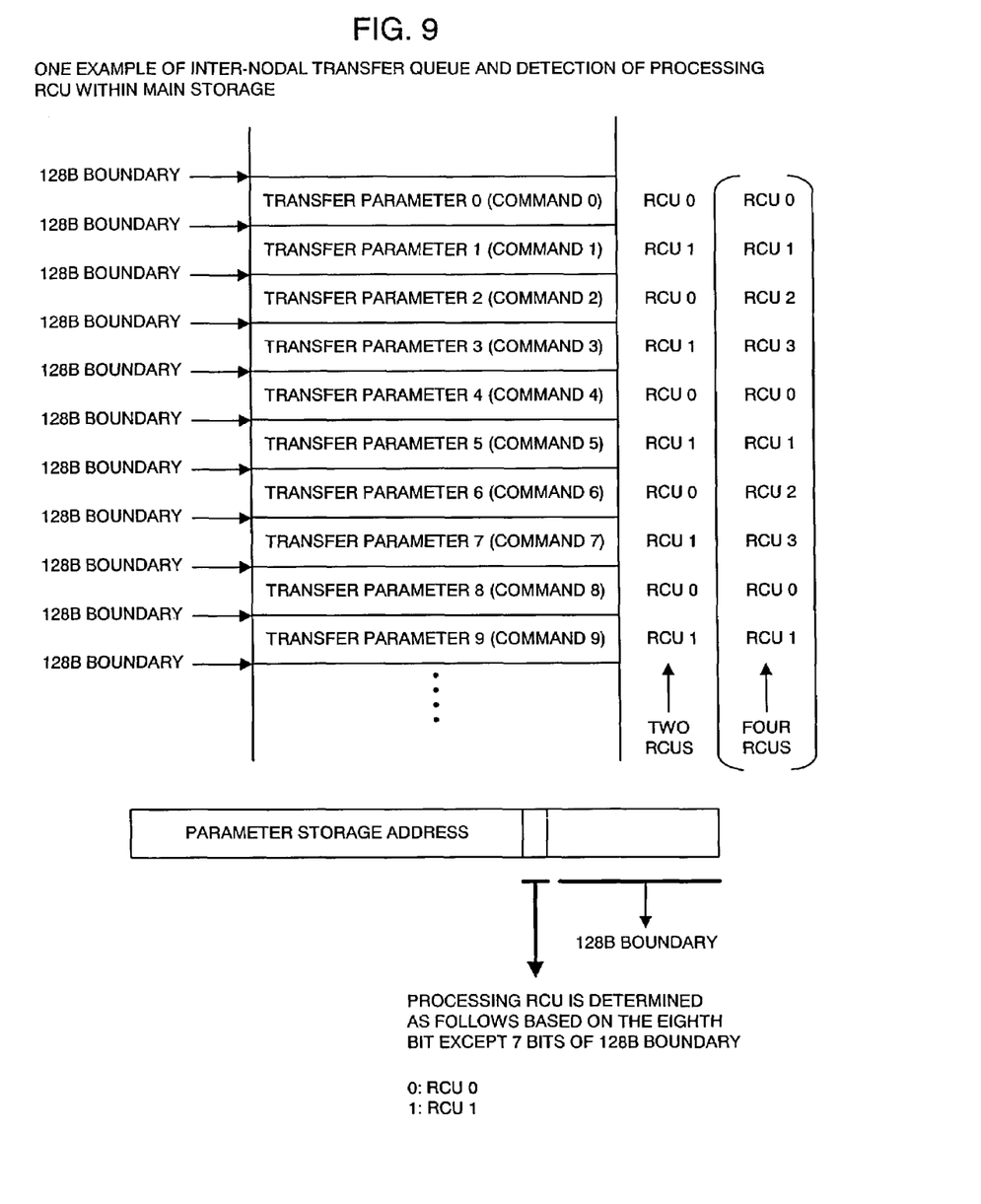
FIG. 9 is a data configuration diagram showing an example of an inter-nodal transfer queue and a detection of a processing RCU within main storage in the multi-node computer system in relation to the present invention.

FIG. 9 shows a condition in which the user program maintains this inter-nodal transfer in order, and the transfer parameters necessary for the inter-nodal transfer command are written in a memory address maintained in this manner. A transfer parameter of 128B is written for each command, and each command shows an address of a boundary of this 128B as a parameter storage address by means of a command, and accordingly, after the command is issued, the inter-nodal control device reads a transfer parameter from the parameter storage address, and conducts the inter-nodal data transfer in accordance with the contents that were read.

Figure 8:
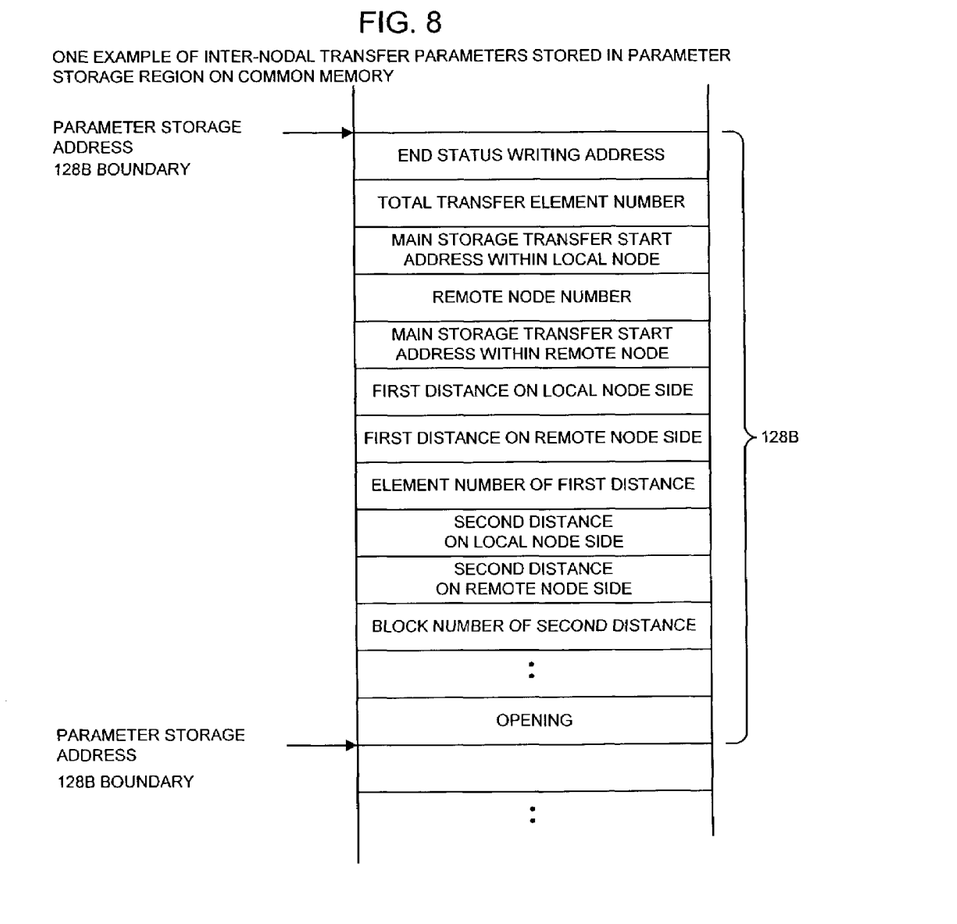
FIG. 8 is a data configuration diagram of inter-nodal transfer parameters stored in a parameter storage region on a common memory in the multi-node computer system in relation to the present invention.

FIG. 8 shows one example of the transfer parameter that is written by the user program on the common memory for every command. One unit of this transfer parameter is 128B, and parameters necessary for the inter-nodal transfer are registered therein. Also, FIG. 8 is a parameter example of a two-distance transfer for efficiently transferring one part (sub-array) of a multi-dimensional array data together in the inter-nodal data transfer, which includes here an end status writing address showing an address at which a status on whether a transfer result is a normal end or an exception occurs is written in a memory, a total transfer element number showing a whole transfer content by means of element number conversion when an 8B data is assumed to be one element, a transfer start address of a node (local node) where a processor which issues a command exists, the number of a node (remote node) which is a transfer destination in the inter-nodal transfer, a main storage transfer start address within the remote node, first and second distances (referred to as distances, hereinafter) between elements of the local node and the remote node, transfer element numbers of the first and second distances or the like.

In the inter-nodal transfer command, mainly there are a read transfer command by which a data is read from a memory in the remote node, the data that was read is transferred from the remote node to the local node, and the data is written in a memory in the local node, and a write transfer command by which a data is read from a memory in the local node, the data that was read is transferred from the local node to the remote node, and the data is written in a memory in the remote node, and however, in this embodiment, an operation in relation to the write transfer will be explained in detail.

The inter-nodal transfer command set by the user program is issued from the command control section of the processor in FIG. 3. In this command, information of a transfer classification that shows a write transfer, the parameter storage address or the like is included, and the command control section notifies the memory access control section of the information. In the memory access control section, to send an inter-nodal transfer request to the inter-nodal control device, the inter-nodal transfer command is converted into a format of memory access by using an access path to the usual common memory.

Figure 7:
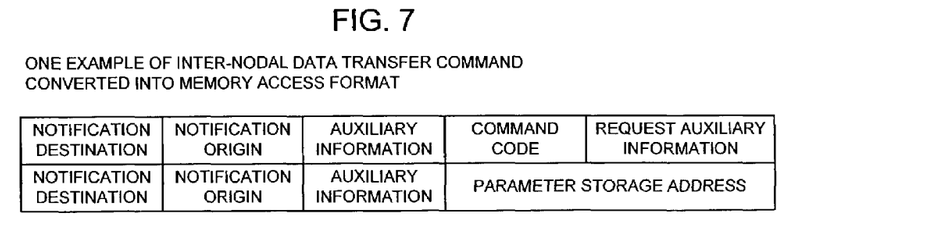
FIG. 7 is a command configuration diagram showing an example of an inter-nodal data transfer command converted into a memory access format in the multi-node computer system in relation to the present invention.

FIG. 7 shows one example of an inter-nodal transfer request converted into the memory access format in the memory access control section. Although, in the memory access format, information of a request notification destination, information of a request notification origin, a command code, address information or the like are included, in a case of the inter-nodal transfer command, for the notification destination information, an RCU number for which this command is executed, and the transfer parameter storage address at which the user program maintained as address information and wrote parameters are set. At this time, in the processing RCU determination circuit 35, as shown in FIG. 9, a processing RCU is determined by means of the parameter storage address, and request notification destination information is generated and set in the inter-nodal transfer request, and is issued to the common memory. Although, in FIG. 9, commands accumulated in the queue in order are shown, by means of the memory addresses at which the commands are accumulated in this manner, the RCU for processing the said commands is determined.

In this embodiment, although there are two RCUs within a node, the RCUs for the processing are allocated in order by means of the parameter storage address so that a command 0 which accumulates a transfer parameter 0 is processed by an RCU 0, a command 1 which accumulates a transfer parameter 1 is processed by an RCU 1, and a command 2 which accumulates a transfer parameter 2 is processed by an RCU 0. Although, in parentheses, a case where there are four RCUs is shown as other example, also in this case, same as a case where there are two, the RCUs for processing the commands are allocated by means of the transfer parameter storage address so that if the command accumulates a transfer parameter 0, it is processed by an RCU 0, if the command accumulates a transfer parameter 1, it is processed by an RCU 1, if the command accumulates a transfer parameter 2, it is processed by an RCU 2, if the command accumulates a transfer parameter 3, it is processed by an RCU 3, and if the command accumulates a parameter 4, it is processed by the RCU 0.

In this operation, in case that there are two RCUs as shown in FIG. 9, the processing RCU is detected by the eighth bit except 7 bits of a 128B boundary of the parameter storage address. The inter-nodal transfer request that generates the request notification destination information in the processing RCU detection circuit is issued to the common memory, and the common memory that was notified conducts routing of this request to a desired RCU based on the request notification destination information.

On the other hand, the memory access control section 45 of the RCU that was determined by the processing RCU determination circuit 35 (FIG. 3) and received the inter-nodal transfer request from the access path 47 in FIG. 4 transfers the received request from the common memory to the request processing section 42. In the request processing section 42 that received the transfer, based on a command code of this request, such as the format shown in FIG. 7, it is confirmed that the transfer is a write transfer, and instruction is issued to the memory access control section 45 so that transfer parameters are read from the parameter storage address. In the memory access control section 45, the parameters for 128B are read from the transfer parameter storage address of the common memory, and are transferred to the request processing section 42.

In the request processing section 42, as exemplified in FIG. 8, the main storage transfer start address of the local node, the total transfer element number, the first distance and the second distance of the local node, and element numbers of the first and second distances are detected, respectively, from the contents of the parameters that were read, and instruction is issued to the memory access control section 45 so that, based on these, the RCU reads a data of the common memory of the local node, which should be write-transferred from the local node to the remote node. In the memory access control section 45, in accordance with this instruction, a data to be transferred between the nodes is read from the common memory, and is sent to the inter-nodal data transmitting and receiving section 43.

In the inter-nodal data transmitting and receiving section 43, the transferred data read from the common memory is stored in a buffer once for every predetermined unit, and after it is stored for a determined unit, the storage is notified to the request processing section 42. In the request processing section 42, when it is notified that the predetermined unit is stored in the buffer, in a data transfer to the remote node, the remote node number, the main storage transfer start address within the remote node, and the first and second distances of the remote node, which were written in the parameters, are sent to the inter-nodal data transmitting and receiving section 43, and instruction is issued so that the data transfer should be started.

Figure 10:
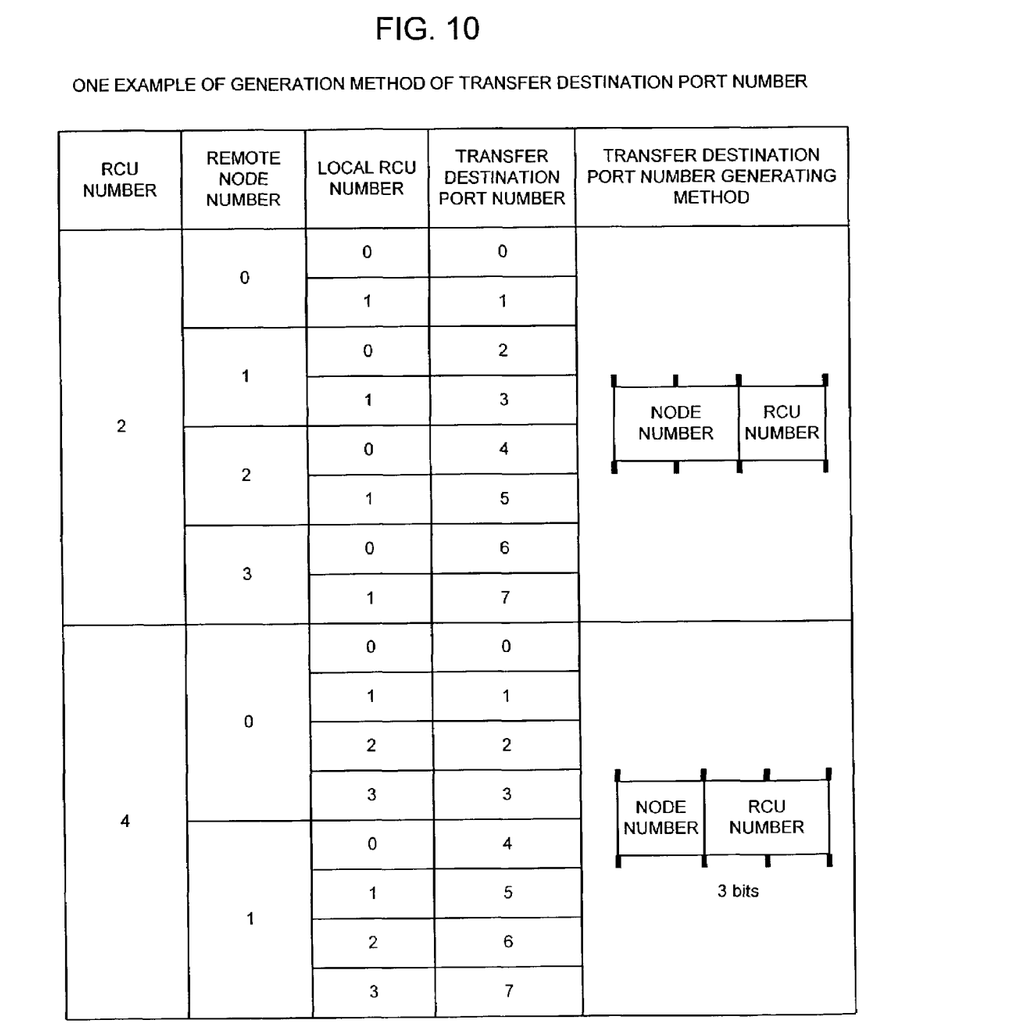
FIG. 10 is an explanatory diagram showing an example of a generation system of a transfer destination port number in the multi-node computer system in relation to the present invention.

The inter-nodal data transmitting and receiving section 43 that received this transfers the remote node number, the main storage transfer start address within the remote node, and the first and second distances of the remote node to the remote node as control information before sending the data. At this time, routing information (a port number) of the inter-nodal crossbar switch for a transfer to the remote node is generated by the port number generating circuit. FIG. 10 shows a port number generating system by means of the port number generating circuit. Referring to FIG. 5 at the same time, in case that the RCU number within an old node is one, the port number showing the routing information of the inter-nodal crossbar switch coincides with the node number so that a node 0 is a port 0, a node 1 is a port 1, and a node 2 is a port 3, and however, if there are two RCUs, since two ports of the crossbar switch are used by one node, ports 0 and 1 correspond to a node 0, ports 2 and 3 correspond to a node 1, ports 4 and 5 correspond to a node 2, and ports 6 and 7 correspond to a node 4, and accordingly, the node number does not coincide with the port number. Accordingly, it is necessary to correct this, and the port numbers are generated by the port number generating circuit 44 so that, as shown in FIG. 10, when the remote node number is 0, if the local RCU number is 0, the port number 0 is generated, and if the local RCU number is 1, the port number 1 is generated, and when the remote node number is 1, if the local RCU number is 0, the port number 2 is generated, and if the local RCU number is 1, the port number 3 is generated, and when the remote node number is 2, if the local RCU number is 0, the port number 4 is generated, and if the local RCU number is 1, the port number 5 is generated, and when the remote node number is 3, if the local RCU number is 0, the port number 6 is generated, and if the local RCU number is 1, the port number 7 is generated.

In addition, in case that there are four RCUs, the port numbers are generated so that, when the remote node number is 0, if the local RCU number is 0, the port number 0 is generated, and if the local RCU number is 1, the port number 1 is generated, and if the local RCU number is 2, the port number 2 is generated, and if the local RCU number is 3, the port number 3 is generated, and when the remote node number is 1, if the local RCU number is 0, the port number 4 is generated, and if the local RCU number is 1, the port number 5 is generated, and if the local RCU number is 2, the port number 6 is generated, and if the local RCU number is 3, the port number 7 is generated. The port numbers generated in this manner are sent to the inter-nodal crossbar switch, and thereby, the inter-nodal data transmitting and receiving section sends the remote node number, the main storage transfer start address within the remote node, and the first and second distances of the remote node to the inter-nodal crossbar switch as the control information, and further, sends the transferred data of a determined unit in order, which is stored in the buffer.

The inter-nodal crossbar switch changes a switch of the crossbar in accordance with the port number, and transfers the control information and transferred data to the remote node by transferring the control information and data to a desired port.

In the remote node, the inter-nodal data transmitting and receiving section 43 within the inter-nodal control device RCU receives the control information and transferred data that were sent, and the control information is sent to the request processing section 42, and the transferred data is stored in a buffer within the transmitting and receiving section once. In the request processing section 42 that received the control information, based on the contents thereof, a common memory address for storing the transferred data within the remote node is generated for the memory access control section 45, and instruction for reading the transferred data within the buffer of the data transmitting and receiving section 43 is provided, and both are sent to the memory access control section 45. In the memory access control section 45, the common memory address from the request processing section 42 and the transferred data from the data transmitting and receiving section 43 are received, and are issued to the common memory as a memory writing request.

The write transfer of the inter-nodal transfer is conducted in the above manner. Also, the read transfer of the inter-nodal transfer is established by informing the remote node of data reading instruction from the local node, conducting the reading of the data from the common memory in the remote node, sending the data that was read to the local node by means of the inter-nodal crossbar switch, and in the local node, writing the data that was sent in the common memory within the local node.

In addition, in the inter-nodal transfer, although the inter-nodal control devices RCUs conduct processing, since the commands accumulated in the queue are issued in order, and the plurality of RCUs conduct the processing of the individual inter-nodal transfer commands in parallel, a capacity of a transfer capacity of one RCU x an RCU number can be maintained as a transfer capacity. Also, since the inter-nodal control device has the buffer for storing the request from the processor, the processor can issue the inter-nodal transfer command to the inter-nodal control device without waiting for the end of the inter-nodal transfer, and the inter-nodal control devices conduct the processing in order of the issue, and accordingly, the inter-nodal transfer can be continuously conducted.

Figure 6:
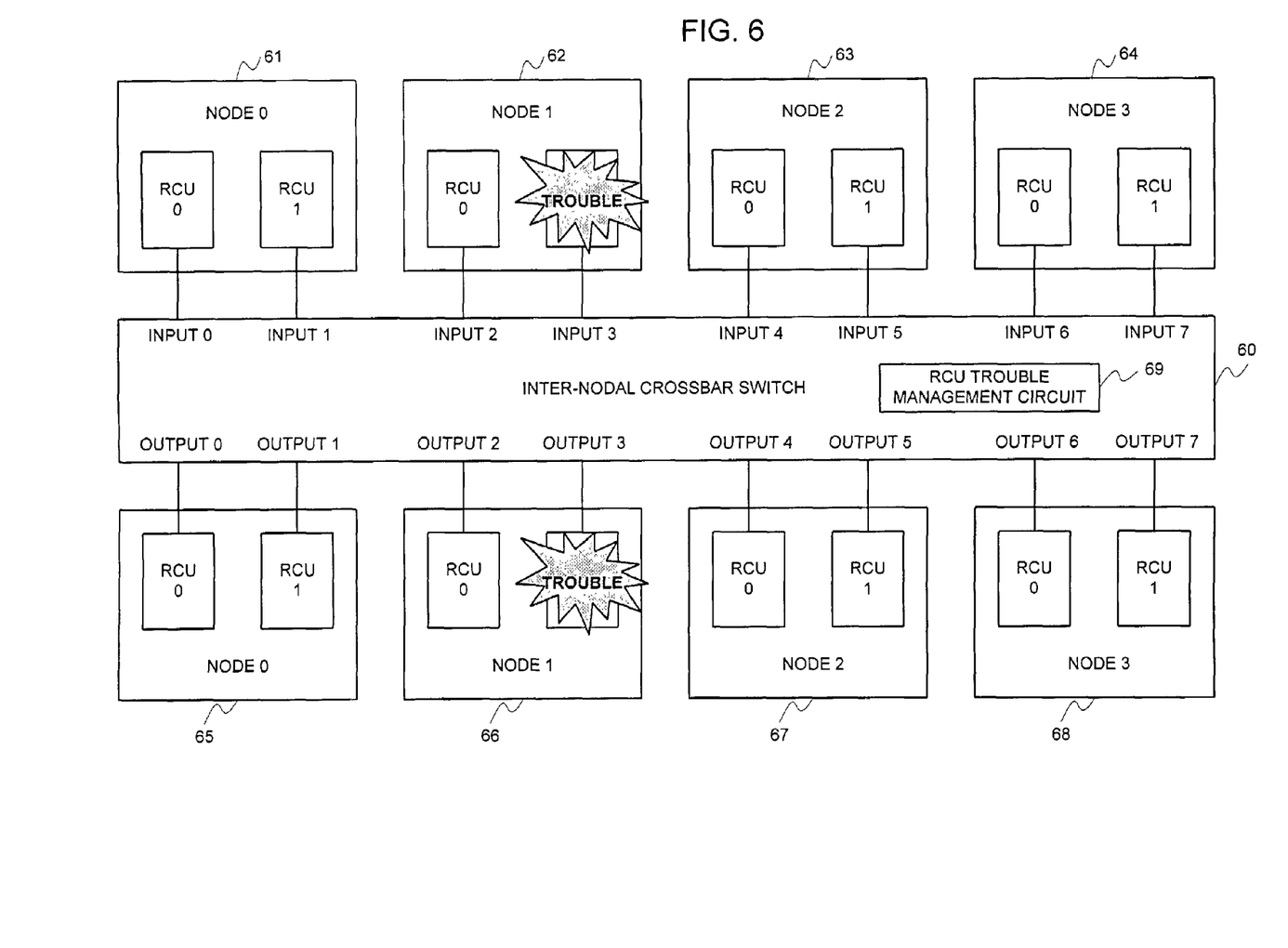
FIG. 6 is a block diagram showing an arrangement example of an inter-nodal crossbar switch in which a countermeasure is taken into account when a trouble of the inter-nodal control device (RCU) occurs in the multi-node computer system in relation to the present invention.
Figure 11:
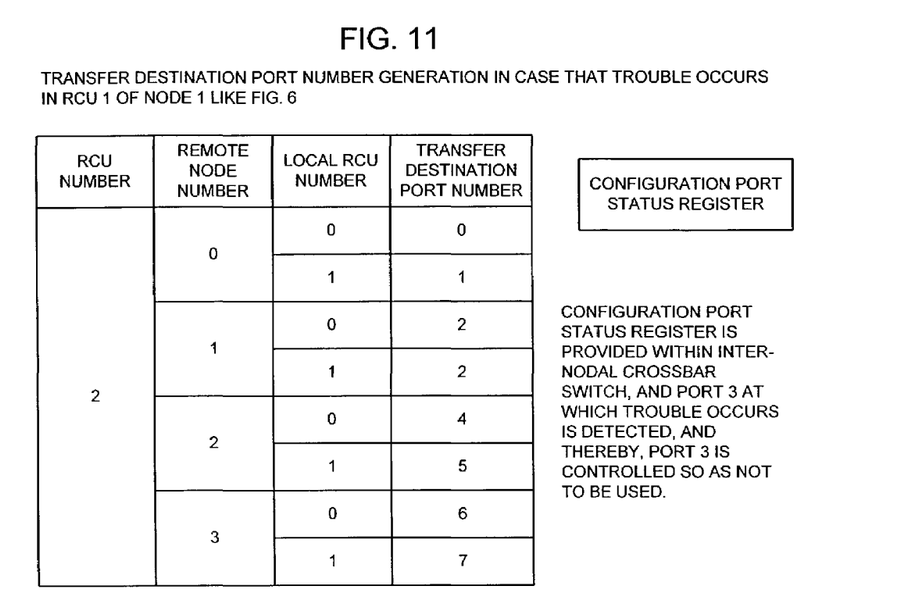
FIG. 11 is an explanatory diagram showing a generation example of the transfer destination port number in case that a trouble occurs in an RCU 1 of a node 1 like FIG. 6

FIG. 6 shows an arrangement of other embodiment. Although its basic arrangement is the same as described above, it is further contrived for a case where a trouble of the inter-nodal control device occurs. This figure will be explained as an embodiment for a case where a trouble occurs in an RCU 1 of a node 1. In an inter-nodal crossbar switch 60, an RCU trouble management circuit 69 for detecting a state of the inter-nodal control device of each node is provided. The RCU trouble management circuit is a circuit for determining that a trouble occurs in the RCU within a node, based on the contents of data transmission and reception to and from the RCU, detecting RCU trouble, and without using the port in a subsequent transfer, for conducting control so that a port that has no trouble in the same node is allocated. Thereby, in case that a trouble occurs in the RCU 1 of the node 1, a port 3 (an input 3 and an output 3) cannot be used. Accordingly, in case of an inter-nodal transfer in which the port 3 is designated as a port number by a node other than the node 1, the RCU trouble management circuit conducts control so as to conduct routing to the port 2 in which a trouble of the node 1 does not occur. As shown in FIG. 11, this is established by providing in the RCU trouble management circuit a configuration port status register for showing a trouble state of each port of the inter-nodal crossbar switch. Thereby, in case that the port number is set at the port 3 by each node and the inter-nodal data transfer is transmitted, the transfer is switched to other RCU in the same node, in other words, in this case, to the RCU 0 (port 2) in the node 1, so as not to have access to the port 3.

Figure 12:
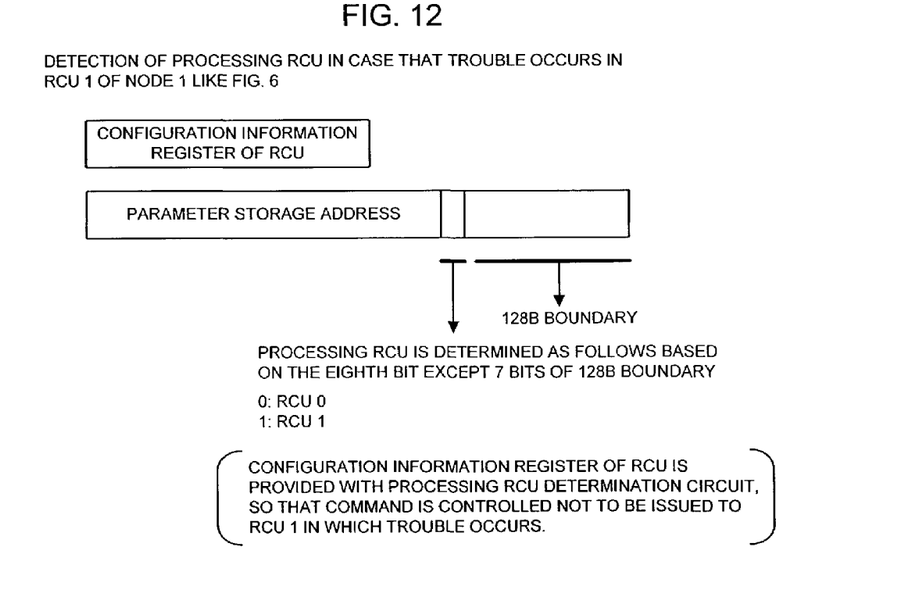
FIG. 12 is an explanatory diagram showing a detection state of the processing RCU in case that a trouble occurs in an RCU 1 of a node 1 like FIG. 6.

Also, as shown in FIG. 12, within the node, an RCU configuration information register is provided in the processing RCU determination circuit, and an RCU in which a trouble occurs is detected, and the setting of the processing RCU number, which is conducted by the parameter address, is controlled so that it is allocated to the RCUs other than the RCU in which a trouble occurs. In a case of this figure, since there are two RCUs in its arrangement, in case that a trouble occurs in an RCU 1, whole inter-nodal transfer requests are controlled so as to be processed in an RCU 0.

As explained above, even in case that a trouble occurs in any of the plurality of RCUs within a node, and it cannot be used, by using an RCU within the node, in which a trouble does not occur, it becomes possible to continue the processing without making the node down.

As explained above, in the present invention, advantages described below can be effected. The first advantage is that, by making it possible to set the plurality of inter-nodal control devices freely, an inter-nodal transfer capacity can be set flexibly in accordance with a capacity within a node or in accordance with a feature of the user program.

The second advantage is that, by making the queue of the inter-nodal control devices one, and establishing the control of the plurality of inter-nodal control devices by means of hardware, the user program does not have to be aware of the plurality of inter-nodal control devices, and the same program can be accommodated to any system configuration.

The third advantage is that, since the improvement of an inter-nodal transfer capacity is not established by the expansion of data width in one command, and is realized by means of the parallel execution of a plurality of commands, it is not necessary to ensure an order of memory access within the commands, and hardware for ensuring the order is not needed, and a simple hardware configuration can be adopted.

The fourth advantage is that, since the improvement of an inter-nodal transfer capacity is not established by the expansion of data width in one command, and is realized by means of the parallel execution of a plurality of commands, even in case of a command having a small transfer content and even in case that there is a fraction in data width, it is possible to maintain a transfer capacity without uselessness.

The fifth advantage is that, by providing the plurality of inter-nodal control devices, even in case that one inter-nodal control device is out of order, since a continuous operation can be conducted by means of the remaining inter-nodal control devices, it is possible to improve the reliability and availability of a system.

What is claimed is:

1. An inter-nodal data transfer system in a multi-node computer system, the system comprising:
    an inter-nodal crossbar switch for conducting an inter-nodal data transfer; and
    a plurality of nodes connected in parallel,
    wherein each of the plurality of nodes comprises a plurality of inter-nodal control means, each of the plurality of inter-nodal control means being coupled to the inter-nodal crossbar switch for processing an inter-nodal transfer command
    wherein an inter-nodal transfer capacity is variably set in accordance with a capacity within a node.

2. The inter-nodal data transfer system recited in claim 1, further comprising a processing RCU determination means for allocating a command to said inter-nodal control means.

3. The inter-nodal data transfer system recited in claim 1, wherein each of said inter-nodal control means comprises a port number generating means for generating routing information of the inter-nodal crossbar switch.

4. The inter-nodal data transfer system recited in claim 1, wherein an inter-nodal transfer capacity is variably set in accordance with a capacity within a node.

5. The inter-nodal data transfer system as recited in claim 4, wherein said inter-nodal transfer capacity is variably set by said plurality of inter-nodal control means which process a plurality of inter-nodal transfer commands in parallel.

6. An inter-nodal data transfer system in a multi-node computer system in which a plurality of nodes are connected in parallel, the system comprising:
    an inter-nodal crossbar switch for conducting an inter-nodal data transfer;
    a plurality of inter-nodal control means at a connection part between the inter-nodal crossbar switch and each node so as to process an inter-nodal transfer command; and
    a trouble management means within said inter-nodal crossbar switch, for managing trouble of said inter-nodal control means,
    wherein an inter-nodal transfer capacity is variably set in accordance with a capacity within a node.

7. The inter-nodal data transfer system recited in claim 6, wherein said trouble denotes a failure of at least one of said inter-nodal control means.

8. An inter-nodal data transfer apparatus in a multi-node computer system, the apparatus comprising:
    an inter-nodal crossbar which conducts an inter-nodal data transfer; and
    a plurality of nodes which are connected in parallel,
    wherein each of the plurality of nodes comprises a plurality of inter-nodal control devices, each of the plurality of inter-nodal control devices being coupled to the inter-nodal crossbar switch,
    wherein each of the inter-nodal control devices processes an inter-nodal transfer command.

9. The inter-nodal data transfer apparatus recited in claim 8, further comprising a processing RCU determination circuit for allocating a command to said inter-nodal control devices.

10. The inter-nodal data transfer apparatus recited in claim 8, wherein each of said inter-nodal control devices comprises a port number generating circuit for generating routing information of the inter-nodal crossbar switch.

11. The inter-nodal data transfer apparatus recited in claim 8, wherein an inter-nodal transfer capacity is variably set in accordance with a capacity within a node.

12. The inter-nodal data transfer apparatus recited in claim 11, wherein said inter-nodal transfer capacity is variably set by said plurality of inter-nodal control devices which process a plurality of inter-nodal transfer commands in parallel.

13. An inter-nodal data transfer apparatus in a multi-node computer system in which a plurality of nodes are connected in parallel, the apparatus comprising:
    an inter-nodal crossbar for conducting an inter-nodal data transfer;
    a plurality of inter-nodal control devices at a connection part between the inter-nodal crossbar switch and each node; and
    a trouble management means within said inter-nodal crossbar switch, for managing trouble of said inter-nodal control devices,
    wherein each of the inter-nodal control devices processes an inter-nodal transfer command.

14. The inter-nodal data transfer apparatus recited in claim 13, wherein said trouble denotes a failure of at least one of said inter-nodal control devices.

* * * * *